United States Patent Office 2,724,645
Patented Nov. 22, 1955

2,724,645

METHOD FOR BENEFICIATING MANGANESE ORES

William Stephen Stringham and Glenn Nelson Summers, Joplin, Mo., assignors to Bruce Williams, Joplin, Mo.

No Drawing. Application May 19, 1954, Serial No. 430,984

6 Claims. (Cl. 75—110)

This invention relates to a new and improved process for recovering manganese from manganese-containing materials such as its ores.

The recovery of manganese, particularly from soft, pulverulent ores, has hitherto posed a number of problems. For the most part, such ores are not adapted to mechanical concentration and require hydrometallurgical treatment. Difficulty in the application of such treatment is, in large measure, due to the fact that the manganese is generally present in both its oxidized and reduced forms, namely, in the manganous and manganic condition. The manganic form does not react with leaching compounds such as sulfuric acid and its salts or hydrochloric acid and its salts in solution. For reaction with such compounds, it has been necessary to subject the ore to a reducing roast prior to treatment with the leaching agent or to treat the material with a solution of sulfur dioxide. The former procedure possesses the disadvantage of reducing impurities such as iron and thus rendering them, like the manganese, subject to reaction with the leaching agents to form soluble compounds. Ferric iron, for example, is reduced to the ferrous state and goes into solution with the manganese upon treatment with the leaching agents. The latter procedure possesses the disadvantage of forming, in addition to manganese sulfate, manganese dithionate which is very difficult and expensive to handle. Recovery of manganese from the dithionate requires oxidation to the sulfate by heating in the presence of air or oxygen in an autoclave at high temperature and pressure. Ores containing high percentages of impurities such as phosphorous and silica have also been difficult to process. In general, processing of soft, pulverulent ores and ores of high impurity content has hitherto been economically unfeasible because of high cost and low recovery.

The object of this invention is to provide a new and improved method for recovering manganese from manganese-containing materials, such as its ores, which permits high recovery at relatively low cost regardless of the state of oxidation of the manganese.

Another object is to provide a process for recovering manganese of high purity regardless of the presence of impurities such as phosphorous and iron in the original material.

Still another object is to provide a process which makes economically feasible the processing of soft, pulverulent manganese ores.

Other objects and advantages of our process will become evident from the following detailed description.

Broadly, our invention comprises roasting the manganese-containing material with ammonium sulfate, ammonium bisulfate, ammonium sulfite, ammonium bisulfite or mixtures thereof in combination with ammonium chloride at elevated temperatures to form manganese sulfate and manganese chloride, leaching these soluble compounds with water and then recovering the manganese from solution. The sulfate and sulfite salts react with the manganese in the manganic state to form manganese sulfate and the ammonium chloride reacts with manganese in the manganous state to form manganese chloride. Thus, the manganese in both the higher and lower states of oxidation are recovered simultaneously without requiring a preliminary high temperature reduction roast. The reactions which occur are as follows, employing manganese oxides in the oxidized and reduced states:

$3MnO_2+3(NH_4)_2SO_4+heat=$
$\qquad N_2+3MnSO_4+4NH_3+6H_2O$
$3MnO_2+3NH_4HSO_4+heat=3MnSO_4+N_2+NH_3+6H_2O$
$2MnO_2+2(NH_4)_2SO_3+heat=2MnSO_4+4NH_3+2H_2O$
$MnO_2+NH_4HSO_3+heat=MnSO_4+NH_3+H_2O$
$MnO+2NH_4Cl+heat=MnCl_2+2NH_3+H_2O$ We have found that at sufficiently elevated roasting temperatures, the objectionable manganese dithionate is not obtained. It is desirable, therefore, to maintain the roast at a temperature at which any manganese dithionate formed will be decomposed. In general, we prefer to employ a minimum roasting temperature of about 850° F. both because of the elimination of dithionate at such temperatures and the rapidity of reaction obtained. Somewhat lower temperatures may be used but, from the point of view of manufacturing expediency, are somewhat uneconomical because of the longer roasting period required. Maximum temperature is determined by the temperature at which manganese sulfate or manganese chloride decomposes. In general, we have found about 900° to 1000° F. to be optimum.

Although the sulfate and sulfite reagents reduce the higher valence manganese, they do not reduce and thus solubilize other impurities such as iron which is normally present in the ferric state. Our process is particularly advantageous for use with ores of high iron and phosphorous content since these impurities are not appreciably solubilized and the small amounts present as soluble constituents of the ore which do go into solution with the manganese sulfate and manganese chloride are easily separated.

The inclusion of ammonium chloride is advantageous not only when manganese is present in the lower state of oxidation, as in the case of MnO, but is highly beneficial when all of the manganese is in the manganic state, as for example as $MnO_2$. We have found that in the latter case, recovery of the manganese is considerably improved. The reason for this is not entirely clear but we believe that the ammonium chloride may promote more complete decomposition of complex oxides.

The ore or other manganese-containing material generally requires no preliminary processing except that additional comminution may be desirable to promote speed and completion of reaction and facilitate leaching. Preferably the ore is ground to a minimum of about 100 mesh. The ore is mixed with the ammonium salt reagents and introduced into a rotating kiln or other suitable device and heated with continuous agitation until fuming ceases. This generally requires about 2 hours. The ammonium salts may be introduced dry or in the form of a concentrated solution or slurry such as that obtained in the course of subsequent recovery of the ammonium salts. Where an aqueous solution or slurry is employed, the water is rapidly evaporated by the high temperatures in the kiln and then the reactions between the ore and the ammonium salts proceed in the dry state.

The ammonium chloride and ammonium sulfate or sulfite salts should be introduced in amounts in excess of the theoretical quantity required for reaction with the manganese. Preferably the excess is at least about 10 to 25%. Ammonium chloride should be incorporated even if all of the manganese is in the manganic state, preferably in an amount comprising at least about 10 to 25% of the amount of the sulfate and sulfite salts.

The fumed ammonium chloride is suitably collected and the gaseous products including ammonia, excess sulfur dioxide, nitrogen and air are drawn through an absorption column containing water. The recovered aqueous solution contains ammonium sulfite, ammonium bisulfite and ammonium hydroxide.

After completion of the reaction, the treated ore is leached with water to dissolve the soluble manganese sulfate and manganese chloride salts. Because of the high solubility of these manganese salts, the amount of water can be kept to a minimum to produce a very concentrated solution, thus avoiding the necessity for subsequent concentration by evaporation. The amount of impurities such as iron or phosphorous in the pregnant solution is very low and can readily be separated. The pH of the solution is generally about 2.4 to 2.8.

Iron in the ferric condition may be precipitated as ferric hydroxide by neutralizing the solution to about pH 4.5 with ammonia. If the calcium ion content of the solution is not high enough to precipitate all of the phosphorous as tri-calcium phosphate, this may be accomplished by adding sufficient calcium hydroxide to bring the pH up to about 5.5. Additional ammonia or ammonium hydroxide is then added to raise the pH to about 6.8 to 7.2 to precipitate all remaining iron and phosphorous as iron hydroxide and phosphorous pentoxide.

The soluble manganese sulfate and manganese chloride salts are separated from the filtered solution by addition of ammonia and carbon dioxide in gaseous form or ammonium carbonate to precipitate manganese carbonate and to form ammonium sulfate and ammonium chloride which remains in solution.

The manganese carbonate is filtered and washed and then heated to drive off carbon dioxide. If calcination is carried out in the absence of air, MnO is formed. By introducing air into the calcining furnace, $MnO_2$ is produced. The carbon dioxide may be recovered by passing it through water in an absorption column. Preferably, it is absorbed by a portion of the recovery liquor resulting from absorption of the ammonia and sulfur dioxide gases produced during reaction of the manganese ore with the ammonium sulfate or sulfite salts and ammonium chloride. The carbon dioxide reacts with the ammonium hydroxide present in the recovery liquor to produce ammonium carbonate which may be reused to precipitate the manganese from its soluble salts in the leaching solution.

The recovered, fumed ammonium chloride and the recovery liquor containing ammonium sulfite and ammonium bisulfite obtained during conversion of the manganese ore and the filtrate containing ammonium sulfate and ammonium chloride produced by precipitation of the manganese from the leaching solution with ammonia and carbon dioxide or ammonium carbonate may be combined and recycled in the process. The solution may be evaporated to dryness or, if not already so, evaporated to form a saturated solution or slurry. In the latter case, the remaining water is rapidly driven off at the high temperatures of the reaction retort maintained during the treatment of the manganese ore.

The foregoing process has been applied to ores assaying as low as 10% manganese, up to 25% iron and up to 5.0% phosphorous with consistently good results. Total recovery of the manganese from the manganese-containing material runs as high as 98.5%. Recovery, to some extent, is affected by the amount of primary insoluble materials, such as silicates, present in the ore. When present in substantial amounts, they tend to encase the soluble values and thus interfere with the leaching procedure, reducing recovery somewhat.

In most cases, the product calcined to $MnO_2$ assays over 62.5% manganese as compared with the theoretical value of 63.2% and contains less than 0.04% iron and less than 0.025% phosphorous.

Our process makes possible high recovery of manganese values from both low and high grade ores economically with a minimum of manipulative procedures in conventional apparatus. Preliminary reduction roasts are eliminated. The conversion temperatures employed are relatively low as compared with usual roast temperatures. Reagents are easily recovered and recycled. There is no formation of products such as dithionates which require difficult and expensive processing. The leached, soluble manganese salts may be obtained in the desired maximum concentration without requiring costly evaporation of excessively dilute solutions. The amount of impurities, such as iron and phosphorous, which go into solution is low and is easily separated. The quantity of such impurities which remains in the final product is negligible.

*Example I*

Wad ore assay:

|  | Per cent |
|---|---|
| Mn | 19.22 |
| Fe | 14.20 |
| P | 5.56 |
| $SiO_2$ | 21.45 |

The ore was dried at 105° C. and ground to pass 200 mesh. 100 grams of the sample were combined with ammonium sulfate, in an amount 35% in excess over theoretical required to react with the manganese, and ammonium chloride, in an amount comprising 25% by weight of the ammonium sulfate. The mixture was thoroughly blended, placed in a rotating retort and heated to 900° F. until fuming stopped in about two hours. Enough water to make a 15% solution of manganese sulfate was added for leach. The leach residue was filtered and washed. The solution, which had a pH of 2.3, was neutralized to pH 4.5 to precipitate ferric hydroxide with ammonia, then to pH 5.4 with calcium hydrate to precipitate phosphorous as tri-calcium phosphate, and then to pH 7.0 with additional ammonia. The solution was then allowed to settle and filtered. Sufficient ammonium carbonate was added to the clear filtrate to raise pH to 8.5. The precipitated manganese carbonate was filtered and washed. The residue was dried and ignited to $MnO_2$. Recovery of total manganese was 87.85%. The product analyzed 63.40% Mn, 0.032% Fe, 0.012% P, 0.032% S.

Procedures similar to that used in Example I were employed in Examples II–IV.

*Example II*

Ore assay:

|  | Per cent |
|---|---|
| Mn | 34.2 |
| Fe | 20.1 |
| P | 0.46 |
| Insoluble | 10 |

Recovery of total manganese 92.6%

*Example III*

Ore assay:

|  | Per cent |
|---|---|
| Mn | 51.2 |
| Fe | 6.0 |
| P | 0.52 |
| Insoluble | 6.0 |

Recovery of total manganese 95.7%

*Example IV*

Ore assay:

|  | Per cent |
|---|---|
| Mn | 13.5 |
| Fe | 10.6 |
| P | 0.28 |
| $SiO_2$ | 26.7 |

Recovery of total manganese 81.65%

Example V

Ore assay:
- Mn — 19.07%
- Fe — 14.10%
- P — 0.36%
- SiO₂ — 23.44%
- Mn as MnO₂ — 16.07%
- Mn as manganous — 3.0% = 15.79% of total Mn 5.73 grams $(NH_4)_2SO_4$ (25% excess) and 3.5 grams $NH_4Cl$ were added to a 10 gram sample of the ore and the mixture was processed as in Example I. Recovery of total manganese was 90.69%.

Example VI

Ore assay:
- Mn — 35.98%
- Manganic — 26.90%
- Manganous — 9.08% = 25% of total Mn 5.5 grams $(NH_4)_2SO_4$ were added to a 10 gram sample of the ore and the mixture was processed as in Example I. Recovery was 71.34% of the total manganese.

5.5 grams $(NH_4)_2SO_4$ plus 4 grams $NH_4Cl$ were added to another sample of the same ore and the mixture processed in the same way. Recovery was 96.70% of the total manganese. Recovery was increased by 35.53% as compared with that obtained by the use of $(NH_4)_2SO_4$ alone.

In Examples II–VI, the final product, calcined to $MnO_2$, assayed over 62.5% Mn, less than 0.04% Fe and less than 0.0025% P.

Although this invention has been described with reference to illustrative embodiments thereof, it will be apparent to those skilled in the art that it may be embodied in other forms but within the scope of the appended claims.

We claim:

1. Process for recovering manganese from manganese-containing material which comprises roasting the material with ammonium chloride and a compound selected from the group consisting of ammonium sulfate, ammonium bisulfate, ammonium sulfite and ammonium bisulfite and mixtures thereof, at a temperature above the decomposition temperature of manganese dithionate, and then leaching the roast with water to dissolve the soluble manganese salts.

2. The process of claim 1 in which the roasting temperature is about 850° to 1000° F.

3. Process for recovering manganese from manganese-containing material which comprises roasting the material with ammonium chloride and a compound selected from the group consisting of ammonium sulfate, ammonium bisulfate, ammonium sulfite and ammonium bisulfite and mixtures thereof, said ammonium salts being employed in excess of the amount theoretically required to combine with the manganese present in said material, at a temperature of about 850° to 1000° F., and then leaching the roast with water to dissolve the soluble manganese salts.

4. The process of claim 3 in which the roasting temperature is about 900° to 1000° F.

5. Process for recovering manganese from manganese-containing material which comprises roasting the material with ammonium chloride and ammonium sulfate at a temperature of about 850° to 1000° F., and then leaching the roast with water to dissolve the soluble manganese salts.

6. The process of claim 5 in which the ammonium salts are in excess of the amount theoretically required to combine with the manganese present in the material, and the roasting temperature is about 900° to 1000° F.

References Cited in the file of this patent

UNITED STATES PATENTS

| Number | Name | Date |
|---|---|---|
| 2,176,775 | Sweet et al. | Oct. 17, 1939 |
| 2,176,776 | Sweet et al. | Oct. 17, 1939 |